March 14, 1950
A. STEITZ, JR
AZEOTROPIC DISTILLATION OF 1-BUTANOL FROM METHYL n-BUTYL KETONE
Filed Nov. 18, 1948
2,500,329
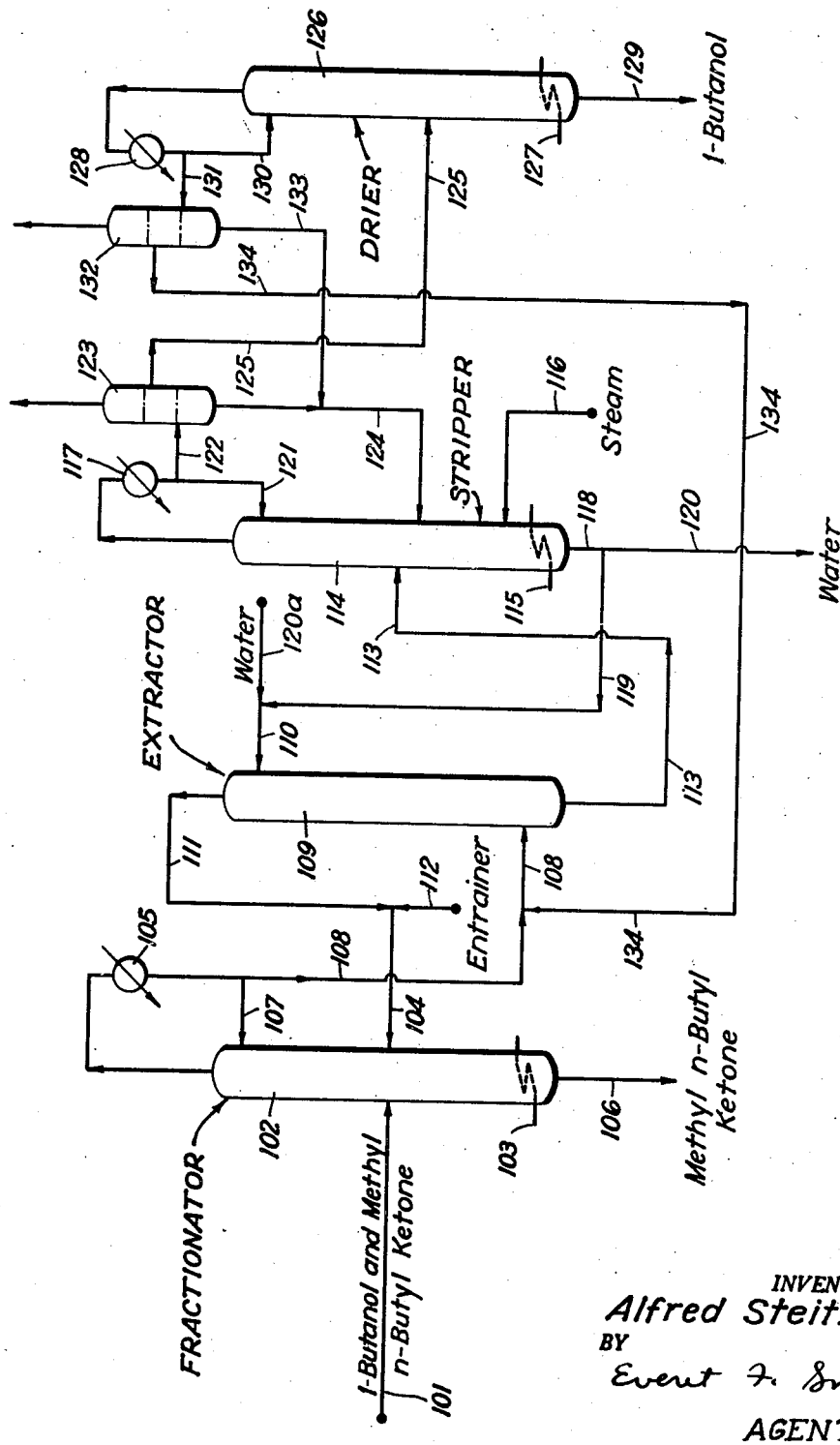
INVENTOR.
*Alfred Steitz, Jr.*
BY
*Everet F. Smith*
AGENT Patented Mar. 14, 1950

2,500,329

UNITED STATES PATENT OFFICE 2,500,329

AZEOTROPIC DISTILLATION OF 1-BUTANOL FROM METHYL n-BUTYL KETONE

Alfred Steitz, Jr., Tulsa, Okla., assignor to Stanolind Oil and Gas Company, Tulsa, Okla., a corporation of Delaware Application November 18, 1948, Serial No. 60,677

8 Claims. (Cl. 202—42)

This invention relates to the purification of alcohols, and more particularly to the separation of 1-butanol from methyl n-butyl ketone.

My invention is a new method for separating 1-butanol from mixtures thereof with methyl n-butyl ketone by fractionally distilling such mixtures in the presence of a hydrocarbon liquid having certain characteristics to be hereinafter defined, and withdrawing a 1-butanol overhead fraction substantially free from ketones and a residual methyl n-butyl ketone fraction substantially free from 1-butanol. Thereafter, I may separate a substantially pure 1-butanol product from the overhead fraction by conventional means.

The major object of my invention is to separate 1-butanol from methyl n-butyl ketone. Other objects are to prepare 1-butanol and methyl n-butyl ketone in substantially pure form from a mixture thereof.

1-butanol and methyl n-butyl ketone cannot be separated by conventional fractional distillation, despite the substantial differences in their boiling points (117.7 and 127.2° C., respectively), owing to the fact that the two compounds form an azeotropic mixture boiling around 116.5° C. and containing approximately 18.2 percent by weight of methyl n-butyl ketone. The problem of effecting this separation is of substantial commercial importance, owing to the fact that mixtures of 1-butanol and methyl n-butyl ketone are produced by various chemical processes, such as the so-called Fischer-Tropsch process, wherein carbon monoxide is hydrogenated over a suitable catalyst, the "Synol" process, which is a modified Fischer-Tropsch process, operated at higher pressure and lower temperature, and various methods for the oxidation of normally liquid hydrocarbons.

I have now discovered that 1-butanol can be separated from methyl n-butyl ketone in a convenient and advantageous manner by distilling a mixture thereof in the presence of a C7 hydrocarbon as an entrainer. Such hydrocarbons form minimum-boiling azeotropes with 1-butanol, but not with methyl n-butyl ketone. The boiling point of the 1-butanol is thereby depressed sufficiently below the azeotrope of 1-butanol and methyl n-butyl ketone so that the 1-butanol may readily be distilled away from the methyl n-butyl ketone, leaving the ketone substantially free from 1-butanol. The resulting distillate fraction contains 1-butanol and entrainer liquid, free from methyl n-butyl ketone, and may subsequently be further processed by conventional means, such as extraction with water or other immiscible solvent, or by extractive distillation, to separate a substantially pure 1-butanol fraction.

The primary distillation of the azeotrope of 1-butanol and entrainer liquid is preferably carried out in the substantial absence of water, since in the presence of water, binary and ternary azeotropes tend to be formed, rendering the complete suppression of methyl n-butyl ketone from the distillate substantially more difficult.

Suitable entrainer liquids for use in my process must form a binary azeotropic mixture with 1-butanol boiling sufficiently below the boiling point (116.5° C.) of the azeotrope of 1-butanol and methyl n-butyl ketone to be separated therefrom by conventional fractional distillation. Moreover, the entrainer liquid preferably should not form an azeotropic mixture with methyl n-butyl ketone; or if it does form such an azeotropic mixture, the boiling point thereof should be far enough below the boiling point of the azeotrope of 1-butanol and methyl n-butyl ketone to permit the separation of the azeotropes by fractional distillation. For this purpose, C7 hydrocarbons in general are satisfactory, including aliphatic hydrocarbons such as 1-heptene, n-heptane, and the like; cycloaliphatic hydrocarbons such as dimethylcyclopentane, methylcyclohexane, 4-methylcyclohexene, and the like; and toluene.

The attached flowsheet illustrates an advantageous embodiment of my invention. For simplicity, various items of equipment such as valves, pumps, heat exchangers, and the like, have been omitted from the drawing.

A mixture of 1-butanol and methyl n-butyl ketone is introduced through line 101 into an intermediate section of fractionator 102, equipped with reboiler 103. Therein, the mixture is fractionally distilled in the presence of a suitable entrainer liquid, such as toluene, which is introduced into the column through line 104, and an azeotropic mixture of 1-butanol and toluene is withdrawn overhead through condenser 105. From the bottom of fractionator 102 a stream of methyl n-butyl ketone substantially free from 1-butanol emerges through line 106, and is withdrawn. This stream may be further purified, if desired, by fractional distillation or by other conventional means.

The overhead stream from fractionator 102 is refluxed in part through line 107 to the top of the column, and the remainder is withdrawn through line 108 and introduced into the of extractor column 109. Within the extractor, the mixture of toluene and 1-butanol flows upward countercurrent to a descending stream of water, which is introduced into the top of the extractor through line 110. The water extracts all or the major proportion of the 1-butanol from the toluene. The washed toluene flows out of the top of the extactor through line 111, and is recycled through line 104 to fractionator 102. Makeup toluene liquid is added to line 104 through line 112 as required.

An aqueous solution of 1-butanol, contaminated with a minor proportion of toluene, flows out of the bottom of extractor 109 through line 113, and is introduced into an intermediate section of stripper column 114, equipped with reboiler 115. The 1-butanol and toluene are stripped out of the aqueous stream by the action of the reboiler and/or free steam, introduced if desired into a lower section of the stripper column through line 116; and a mixture of 1-butanol, toluene, and water is taken off overhead through condenser 117. A lean aqueous stream flows out of the bottom of stripper 114 through line 118, and is recycled in part to the top of extractor 109 through lines 119 and 110. Excess water is withdrawn through line 120 and discarded; and makeup water is added to line 110 as required through line 120a.

The liquid from condenser 117 is refluxed in part to the top of stripper column 114 through line 121, and the remainder is withdrawn through line 122 to decanter 123, where stratification takes place. The aqueous phase therefrom, containing a small proportion of dissolved 1-butanol and toluene, is returned to stripper column 114 through line 124, preferably at an intermediate section. The organic phase, comprising predominantly 1-butanol, plus a small proportion of dissolved water and toluene, is led through line 125 into an intermediate section of drier column 126. Within drier column 126 substantially all of the water and toluene, together with a quantity of 1-butanol, is distilled overhead by the action of reboiler 127 through condenser 128, and a purified, substantially anhydrous 1-butanol stream emerges from the bottom of the column through line 129.

The liquid from condenser 128 is refluxed in part to the top of drier column 126 through line 130, and the remainder is withdrawn through line 131 to decanter 132. The aqueous phase from the decanter contains a small proportion of dissolved 1-butanol and toluene, and is suitably recycled through lines 133 and 124 to stripper column 114. The organic phase, comprising predominantly 1-butanol and toluene, is suitably recycled through lines 134 and 108 to the bottom of extractor column 109.

My invention will be more fully understood from the following specific example.

Into a batch still were introduced 113.5 parts by weight of a mixture of 1-butanol and methyl n-butyl ketone containing 10.8 percent by weight of the ketone, and 410.4 parts by weight of n-heptane, and the total mixture was fractionally distilled through a packed column. After 476 parts by weight of distillate had been withdrawn, the distillation was stopped, and the distillate fraction and the residue were analyzed.

The distillate fraction was found to contain 85.5 parts by weight of 1-butanol, with no detectable quantity of methyl n-butyl ketone.

The residue contained 11.8 parts by weight of methyl n-butyl ketone.

While the above example and flowsheet illustrate advantageous embodiments of my invention, it is to be understood that I am not limited thereto. My invention is to be construed broadly within the scope of the description and the claims, and in general it is to be understood that any modifications or equivalents that would ordinarily occur to those skilled in the art are to be considered as lying within the scope of my invention.

In accordance with the foregoing description, I claim as my invention:

1. In a process for separating 1-butanol from methyl n-butyl ketone, the steps which comprise fractionally distilling a mixture thereof in the presence of a $C_7$ hydrocarbon and separating an overhead fraction comprising 1-butanol substantially free from methyl n-butyl ketone.

2. The process of claim 1 wherein said hydrocarbon liquid comprises predominantly an aliphatic hydrocarbon.

3. The process of claim 2 wherein said hydrocarbon liquid comprises predominantly n-heptane.

4. The process of claim 1 wherein said hydrocarbon liquid comprises predominantly a cycloaliphatic hydrocarbon.

5. The process of claim 4 wherein said hydrocarbon liquid comprises predominantly methylcyclohexane.

6. The process of claim 1 wherein said hydrocarbon liquid comprises predominantly toluene.

7. In a process for separating 1-butanol from methyl n-butyl ketone, the steps which comprise fractionally distilling a mixture thereof in the presence of a $C_7$ hydrocarbon and substantially in the absence of water, and separating an overhead fraction comprising 1-butanol substantially free from methyl n-butyl ketone.

8. In a process for separating 1-butanol from methyl n-butyl ketone, the steps which comprise fractionally distilling a mixture thereof in the presence of a $C_7$ hydrocarbon, and separating a first fraction comprising 1-butanol substantially free from methyl n-butyl ketone and a second fraction comprising methyl n-butyl ketone substantially free from 1-butanol.

ALFRED STEITZ, Jr.

REFERENCES CITED

The following references are of record in the file of this patent:

UNITED STATES PATENTS

| Number | Name | Date |
|---|---|---|
| 2,085,546 | Roelfsema | June 29, 1937 |
| 2,324,255 | Britton et al. | July 13, 1943 |
| 2,351,527 | Lembecke | June 13, 1944 |

OTHER REFERENCES

Analytical Chemistry, vol. 19, pages 550 and 566 (August 1947).